F. B. PATTISON.
BORING TOOL.
APPLICATION FILED JUNE 3, 1918.

1,288,979.

Patented Dec. 24, 1918.

Inventor,
Floyd B. Pattison,

# UNITED STATES PATENT OFFICE.

FLOYD B. PATTISON, OF DETROIT, MICHIGAN.

BORING-TOOL.

1,288,979. Specification of Letters Patent. Patented Dec. 24, 1918.

Application filed June 3, 1918. Serial No. 237,883.

*To all whom it may concern:*

Be it known that I, FLOYD B. PATTISON, a citizen of the United States of America, residing at Detroit, in the county of Wayne and State of Michigan, have invented certain new and useful Improvements in Boring-Tools, of which the following is a specification, reference being had therein to the accompanying drawings.

This invention relates to a hand boring tool, and my invention aims to provide a simple, durable and easily operated tool for enlarging or reaming out openings and recesses, the tool including positive and reliable means, in a manner as hereinafter set forth, for either imparting a continuous rotary movement to a bit or cutter or an intermittent feed for the same, so that the bit or cutter may be continuously advanced or simply advanced during a period of its rotation.

My invention further aims to accomplish the above result by a mechanical construction that will be hereinafter specifically described and then claimed, and reference will now be had to the drawings, wherein—

Figure 1:
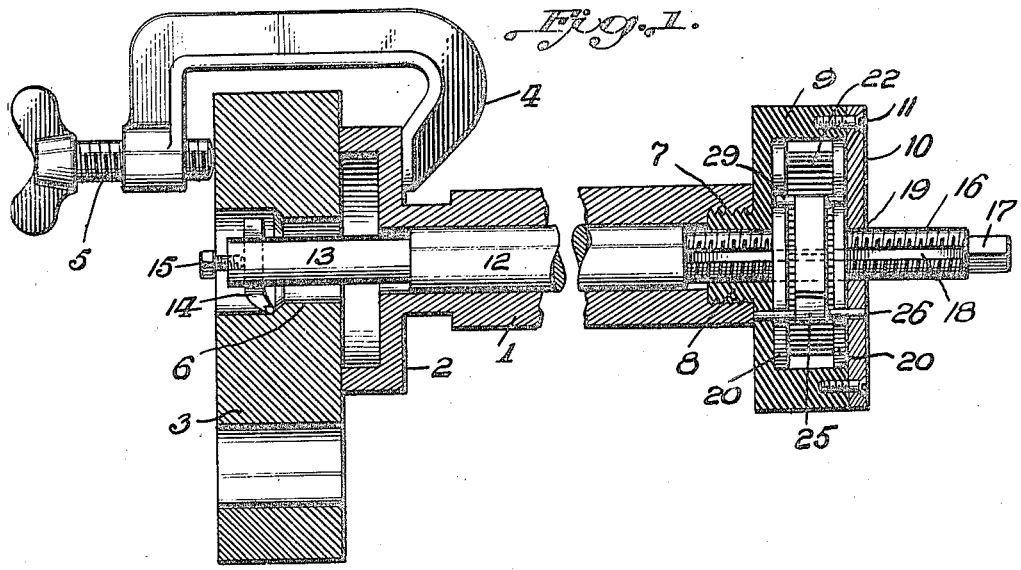
Figure 1 is a longitudinal sectional view of the tool, partly broken away and showing the tool held in operative relation to a piece of work.
Figure 2:
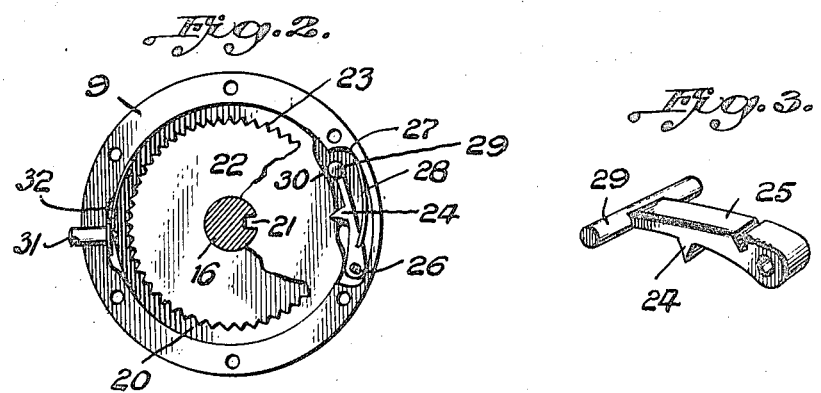
Fig. 2 is an end view of the tool, partly broken away and partly in section.
Figure 3:
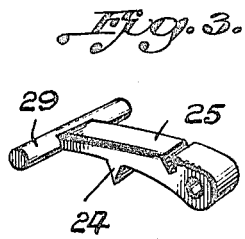
Fig. 3 is a perspective view of a detached pawl.

In the drawing, the reference numeral 1 denotes a barrel having a cylindrical hollow head 2 adapted to be attached to a piece of work 3, by a conventional form of clamp 4 and set screw 5, so that the head 2 will be positioned over the end of a rough opening 6 in the piece of work 3.

The inner end of the barrel 1 is provided with an interiorly screwthreaded socket 7 to receive the exteriorly screwthreaded stem 8 of a cylindrical housing 9 having a detachable end plate 10 held by screws 11 or other fastening means.

Rotatable in the barrel 1 is a tool shaft 12 having the outer end thereof reduced as at 13, and provided with an adjustable cutter or bit 14 that is radially disposed and held in adjusted position by a set screw 15 or other fastening means. The inner end of the shaft 12 is reduced to provide a shank 16 and a tang 17, said shank being screwthreaded and provided with a longitudinal keyway 18. The shank 16 is loose in the stem 8 of the housing 9, and extends through an opening 19 provided therefor at the detachable end plate 10.

Fitted on the shank 16 within the housing 9 and adapted to rotate with said shank are parallel disks 20, said disks having tongues 21 extending into the keyway so that the shank 16 may slide through the disk 20.

Between the disk 20 and in feeding engagement with the shank 16 is a nut 22 having peripheral teeth 23 adapted to be engaged by a tooth 24 on a pawl 25 pivoted on a pin 26 mounted in the housing 9 and the end plate 10 thereof. The end of the housing 9 is recessed, as at 27 to provide clearance for the pawl 25 and a spring 28 is mounted in the pawl 25 to bear against a wall of the recess 27 and maintain the tooth 24 in engagement with the teeth 23 of the nut 22. The tooth 24 is intermediate the ends of the pawl 25 and the free end of said pawl is provided with a transverse head 29 normally engaging the peripheries of the disks 20. These disks have cam surfaces 30 that permit of the head 29 receding toward the axial center of the disk, so that the tooth 24 may engage the teeth 23 of the nut 22 which is of less diameter than said disk. Otherwise, the peripheries of said disks 20 maintain the head 29 within the recess 27 and the tooth 24 out of engagement with the teeth 23 of the nut 22.

The housing 9 has a radially disposed normally retracted stop pin 31 also adapted to engage the teeth 23 of the nut 22, said stop pin being held normally retracted by a spring 32 within the housing 9.

To place the tool in operation, the tool shaft 12 is adjusted so that the outer end thereof may extend through the opening 6 and be provided with the cutter or bit 14, and then the tool shaft is ready to be continuously or independently fed so that the cutter or bit 14 will enlarge or ream the opening 6 as the tool shaft 12 is withdrawn from said opening. A wrench or suitable instrument is placed on the tang 17 of the tool shaft and by rotating said shaft the disks 20 are carried therewith causing the tooth 24 of the pawl 25 to be intermittently moved into and out of engagement with the teeth 23 of the nut 22. It is during the engagement of the tooth 24 with the nut 22 that said nut is held stationary, so that the shank 16 is fed through the nut for a partial rotation of the shaft 12. It is in this manner that the shaft can be intermittently advanced or withdrawn during the rotation of said shaft. Should it be desired to provide a continuous feed for the shaft, then the stop pin 31 is depressed to hold the nut 22 stationary, so that the shank 16 can feed therethrough.

Disks somewhat similar to the disks 20 can be substituted therefor to provide cam surfaces of various lengths and thus regulate the feed of the tool shaft.

It is thought that the operation and utility of my invention will be apparent without further description, and while in the drawing there is illustrated a preferred embodiment of my invention, it is to be understood that the structural elements are susceptible to such variations and modifications as fall within the scope of the appended claims.

What I claim is:—

1. A tool of the type described comprising a barrel adapted to have one end thereof held relative to a piece of work, a rotatable tool shaft in said barrel and having a cutter at one end thereof, a housing carried by said barrel and through which said tool shaft extends, means in said housing adapted to cause said tool shaft to be intermittently fed when said shaft is rotated, and means carried by said housing adapted to cause a continuous feed of said shaft when rotated.

2. A tool of the type described comprising a barrel adapted to have one end thereof held relative to a piece of work, a rotatable tool shaft in said barrel having the end thereof provided with a cutter to operate upon a piece of work, a housing carried in said barrel, a nut free to revolve in said housing and adapted to cause said tool shaft to be shifted longitudinally of said barrel, and means in said housing adapted to intermittently hold said nut stationary so that said tool shaft will be fed when rotated.

3. A tool of the type described comprising a barrel, a rotatable tool shaft in said barrel, a housing carried by said barrel, a nut free to revolve in said housing, means in said housing adapted to intermittently hold said nut and cause said tool shaft to be fed therethrough when rotated, and means carried by said housing so that said nut may be held to provide a continuous feed for said tool shaft when rotated.

4. A tool of the type described, comprising a rotatable tool shaft, disks having a depression in their peripheries rotatable with said tool shaft, a nut between said disks and adapted to cause said tool shaft to be fed relative to said disks, and means common to both of said disks and actuated by the peripheries thereof to move into and out of engagement with said nut to cause said tool shaft to be intermittently fed by said nut when said tool shaft is rotated.

5. A tool of the type described, comprising a barrel, a rotatable tool shaft in said barrel, a housing carried by said barrel and through which said tool shaft extends, a disk in said housing rotatable with said tool shaft, a nut adjacent said disk adapted to cause said tool shaft to be shifted longitudinally of said barrel, means in said housing controlled by said disk adapted to cause said tool shaft to be intermittently shifted in said barrel when said tool shaft is rotated, and means carried by said housing adapted for holding said nut stationary so that said tool shaft may be continuously fed when rotated.

6. Means for feeding a tool comprising a tool shaft, a nut in threaded engagement therewith, a disk at a side of said nut, a pawl supported adjacent said nut and adapted to intermittently engage said nut and hold said nut stationary so that said tool shaft may feed therethrough, and a cross head carried by said pawl normally engaging the periphery of said disk and caused to rise and fall thereby so as to move said tool into and out of engagement with said nut.

In testimony whereof I affix my signature in the presence of two witnesses.

FLOYD B. PATTISON.

Witnesses:
 KARL H. BUTLER,
 ANNA M. DORR.